US008928335B1

(12) United States Patent
Roen

(10) Patent No.: US 8,928,335 B1
(45) Date of Patent: Jan. 6, 2015

(54) STEPPED IMPEDANCE FLEXURE DESIGN IN A HARD DISK DRIVE

(71) Applicant: Hutchinson Technology Incorporated, Hutchinson, MN (US)

(72) Inventor: Michael E. Roen, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 14/163,279

(22) Filed: Jan. 24, 2014

(51) Int. Cl.
*G01R 27/28* (2006.01)
*G06F 17/50* (2006.01)

(52) U.S. Cl.
CPC .................... *G06F 17/5036* (2013.01)
USPC .......................................... 324/617; 324/537

(58) Field of Classification Search
USPC ............ 324/617, 537; 360/224, 244; 260/246
See application file for complete search history.

(56) References Cited

U.S. PATENT DOCUMENTS

| | | | |
|---|---|---|---|
| 5,712,749 A | 1/1998 | Gustafson | |
| 5,717,547 A * | 2/1998 | Young | 360/246 |
| 6,038,102 A | 3/2000 | Balakrishnan et al. | |
| 7,710,687 B1 | 5/2010 | Carlson et al. | |
| 7,986,494 B2 | 7/2011 | Pro | |
| 8,154,827 B2 | 4/2012 | Contreras et al. | |
| 8,189,281 B2 | 5/2012 | Alex et al. | |
| 8,233,240 B2 | 7/2012 | Contreras et al. | |
| 8,289,656 B1 | 10/2012 | Huber | |
| 8,300,363 B2 | 10/2012 | Arai et al. | |
| 8,305,712 B2 | 11/2012 | Contreras et al. | |
| 8,665,565 B2 | 3/2014 | Pro et al. | |
| 8,681,456 B1 | 3/2014 | Miller et al. | |
| 2005/0180053 A1 | 8/2005 | Dovek et al. | |
| 2008/0273266 A1 | 11/2008 | Pro | |
| 2010/0007993 A1 | 1/2010 | Contreras et al. | |
| 2011/0141626 A1 | 6/2011 | Contreras et al. | |
| 2012/0081813 A1 | 4/2012 | Ezawa et al. | |
| 2012/0081815 A1 | 4/2012 | Arai et al. | |
| 2012/0279757 A1 | 11/2012 | Ishii et al. | |
| 2013/0107488 A1 | 5/2013 | Arai | |
| 2013/0176646 A1 | 7/2013 | Arai | |
| 2014/0078621 A1 | 3/2014 | Miller et al. | |

FOREIGN PATENT DOCUMENTS

| | | | |
|---|---|---|---|
| JP | 2003234549 A | 8/2003 | |
| JP | 2008276927 A | 11/2008 | |

OTHER PUBLICATIONS

Pozar, David M. Microwave Engineering, 4th Edition, copyright 2012 by John Wiley & Sons, Inc., pp. 422-426.
U.S. Appl. No. 14/146,760 to Roen, Michael E. entitled Balanced Multi-Trace Transmission in a Hard Disk Drive Flexure, filed Jan. 3, 2014, 32 pages.

(Continued)

*Primary Examiner* — Vincent Q Nguyen
(74) *Attorney, Agent, or Firm* — Faegre Baker Daniels LLP

(57) ABSTRACT

Various embodiments concern a method for forming a trace array by modeling a trace array having a plurality of traces, each trace having a plurality of trace segments corresponding to elements of a filter circuit having alternating high and low impedance elements. The alternating high and low impedance elements can correspond to inductors and capacitors. For each trace segment, a delay constant is measured between a plurality of nodes that are longitudinally arrayed along the trace segment. The delay constant can be a phase delay. The length of each trace segment is set based on the delay constant of the trace segment. The length of each trace segment can be set such that the trace has a linear group delay response across an operational frequency range of the flexure. A trace array is then formed based on the set lengths.

20 Claims, 6 Drawing Sheets

(56) References Cited

OTHER PUBLICATIONS

"Calculating VLSI Wiring Capacitance", Jun. 1990, IBM Technical Disclosure Bulletin, vol. 33, Issue No. 1A, 2 pages.

Hentges, Reed T. et al., "Exploring Low Loss Suspension Interconnects for High Data Rates in Hard Disk Drives", IEEE Transactions on Magnetics, vol. 44, No. 1, Jan. 2008, pp. 169-174.

* cited by examiner

STEPPED IMPEDANCE FLEXURE DESIGN IN A HARD DISK DRIVE

TECHNICAL FIELD

The present invention relates to disk drives. In particular, various embodiments of the invention concern a flexure having a linear group delay response across an operational frequency range of the flexure.

BACKGROUND

Disk drive flexures are generally known and commercially available. Typical flexures transmit signals along disk drive suspensions. Flexures typically comprise a stainless steel base layer extending along part of all of the flexure, the stainless steel layer mounted to the suspension. Flexures typically further include a dielectric material layer extending over at least part of the stainless steel base layer. Flexures typically further include a trace array extending along the dielectric material layer opposite the stainless steel base layer. The trace array electrically connects proximal disk drive control circuitry with electrical elements such as read/write transducers mounted on the distal end of the suspensions. The traces preferably minimize signal distortion in order to minimize data loss, increase data transmission speed, and function in a predictable manner. A flexure should be designed for efficient manufacturing with high yield.

Examples of disk drive components, including flexures, are disclosed in U.S. patent application Ser. No. 14/146,760 to Roen, filed Jan. 3, 2014, and U.S. patent application Ser. No. 14/026,427 to Miller, filed Sep. 13, 2013, each of which is incorporated herein by reference in its entirely for all purposes.

SUMMARY

Various embodiments concern a method for forming a trace array by modeling a trace array having a plurality of traces, each trace having a plurality of trace segments corresponding to elements of a filter circuit having alternating high and low impedance elements. The alternating high and low impedance elements can correspond to inductors and capacitors. For each trace segment, a phase constant is measured using a plurality of nodes that are longitudinally arrayed along the trace segment. The length of each trace segment is set based on the phase constant of the trace segment. The length of each trace segment can be set such that the trace has a linear group delay response across an operational frequency range of the flexure. A trace array is then formed based on the set lengths.

Various embodiments concern a method of forming a trace of a flexure of a hard disk drive. Such methods comprise modeling the trace as having a plurality of trace segments corresponding to elements of a filter circuit comprising inductors and capacitors. Such methods further comprise measuring a change in a signal between a plurality of nodes that are longitudinally arrayed along one of the trace segments. Such methods further comprise setting a length of the trace segment based on the change in a signal. Such methods can further comprise forming the trace based on the set length.

Various embodiments concern a method of forming a trace array of a flexure of a hard disk drive. Such methods comprise modeling a trace array having a plurality of traces, each trace having a plurality of trace segments corresponding to elements of a filter circuit comprising inductors and capacitors. Such methods further comprise, for each trace segment of the plurality of trace segments, measuring a delay constant in a signal from a plurality of nodes that are longitudinally arrayed along the trace segment. The delay constant can be based on a phase delay of the segment. Such methods further comprise, for each trace segment of the plurality of trace segments, setting a length of the trace segment based on the delay constant of the trace segment. Such methods further comprise forming the trace array based on the set lengths.

Further features and modifications of the various embodiments are further discussed herein and shown in the drawings. While multiple embodiments are disclosed, still other embodiments of the present disclosure will become apparent to those skilled in the art from the following detailed description, which shows and describes illustrative embodiments of this disclosure. Accordingly, the drawings and detailed description are to be regarded as illustrative in nature and not restrictive.

DESCRIPTION OF THE INVENTION

Figure 1:
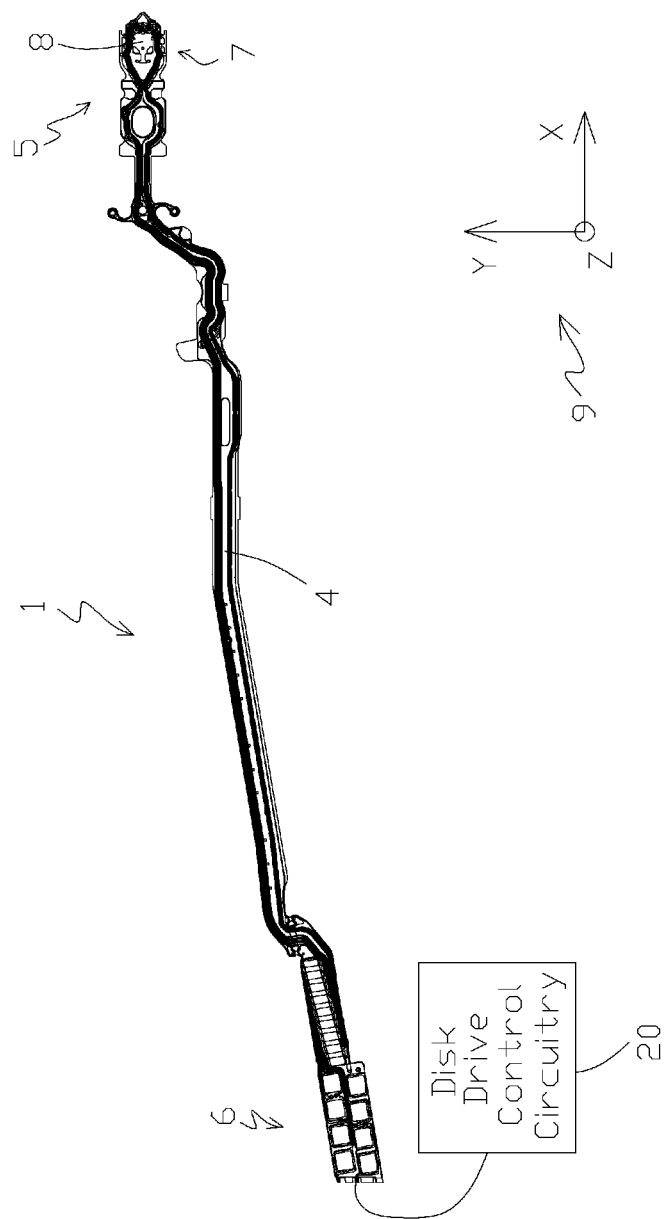
FIG. 1 is a plan view of a flexure and a suspension of a disk drive.

FIG. 1 shows a plan view of a flexure 1. The flexure 1 includes a proximal end 6 and a distal end 5. A trace array 4 extends along the flexure 1 from the proximal end 6 to the distal end 5. The trace array 4 can be one of several trace arrays, such as separate send and receive trace arrays. Traces of the trace array 4 carry signals between the proximal end 6 and the distal end 5. The trace arrays 4 can electrically connect with transducers 7 or other electrical elements at a distal end 5 of the flexure 1. As shown, the distal end 5 of the flexure 1 includes a tongue 8 which can support the transducers 7. The transducers 7 can be configured to perform read and/or write functions with spinning disk media. The trace array 4 extends to a proximal end 6 of the flexure 1. The trace array 4 can electrically connect with disk drive control circuitry 20. The disk drive control circuitry 20 can include one or more processors configured to control the function of the hard disk drive, including reading and writing functions with the transducers 7 by sending and receiving signals along the trace array 4.

A key 9 is shown indicating X, Y, and Z axes. The flexure 1 generally extends longitudinally along an X-axis. The flexure 1 is generally elongated along the X-axis in distal and proximal directions, although multiple bends are typically present, as shown. A longitudinal axis of the flexure 1 accordingly extends lengthwise along the flexure 1, parallel with the X-axis. "Proximal" and "distal", as used herein, refer to the relative direction or position along the longitudinal axis of the flexure 1 while "lateral", as used herein, refers to the left and right directions (along the Y-axis) orthogonal to the longitudinal axis of the flexure 1. The flexure 1 has a generally planar orientation co-planar with the X-Y plane. The Z-axis represents height, thickness, or top and bottom orientations.

Figure 2:
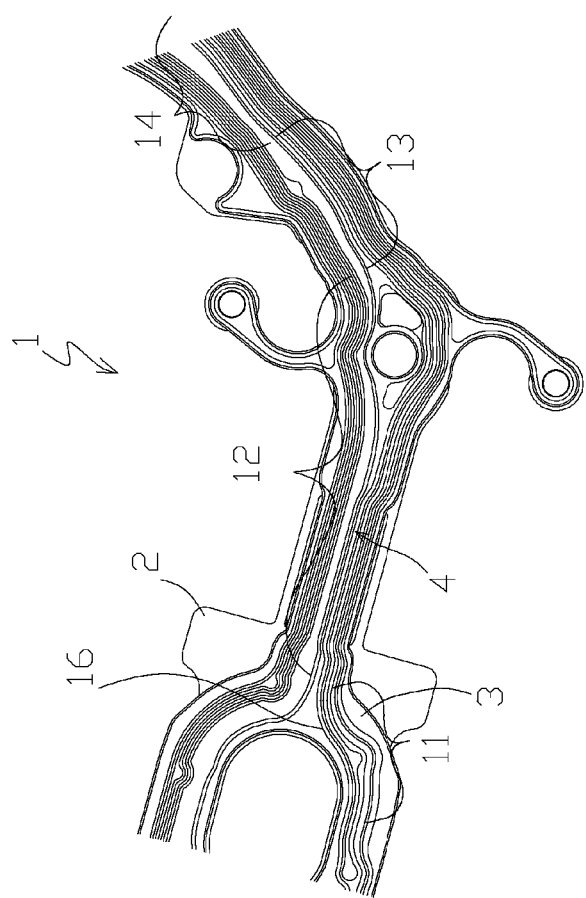
FIG. 2 is a plan view of a section of the flexure of FIG. 1.

FIG. 2 shows a plan view of a section of the flexure 1 of FIG. 1. The flexure 1 comprises a base metal layer 2. The base metal layer 2 can extend from the proximal end 6 to the distal end 5 of the flexure 1. The base metal layer 2 can be formed from stainless steel, however other types of metal such as copper or a non-metal material can alternatively be used. The base metal layer 2 can be the major structural backbone of the flexure 1. The base metal layer 2 supports a dielectric layer 3. The dielectric layer 3 can comprise a first or bottom side that directly contacts the base metal layer 2. The dielectric layer 3 can be attached to the base metal layer 2. The dielectric layer 3 can be formed from a polymer, such as polyimide. FIG. 2 further shows a trace array 4 located on the second or top side of the dielectric layer 3. The trace array 4 comprises a plurality of traces, such as trace 16. The traces can be located on the top surface of the dielectric layer 3 or may be partially or fully embedded in the dielectric layer 3. The traces can be formed from copper, however other conductive metals or other conductive materials can additionally or alternatively be used. The traces of the array 4 can be interleaved such that adjacent traces of the array 4 have different polarities. In other words, the polarities of the traces alternate along a width of the flexure 1 (e.g., generally along the Y-axis). In various embodiments, traces of the flexure 1 can be stacked (e.g., along the Z-axis) such that a dielectric layer is located directly between two overlapping traces that have similar layouts (e.g., lengths, widths, shapes). The layouts of the two traces may mirror each other on opposite sides of the dielectric layer along the length of the flexure 1. Configurations of stacked traces and other elements are disclosed in U.S. Pat. No. 8,289,656 to Huber, the teachings of which are incorporated herein by reference in its entirety for all purposes.

A trace 16 of the trace array 4 comprises a plurality of segments 11-14. The identified segments 11-14 relate to different legs of the trace 16 that extend generally longitudinally along the length of the flexure 1. In this way, each segment corresponds to a longitudinal section of one or more separate traces of an array. The segments 11-14 are shown as serially arrayed along the length of the flexure 1. While some segments 11-14 are shown in FIG. 2, these segments 11-14 can be part of a broader trace circuit that extends from a proximal end 6 to the distal end 5 of the flexure 1. Additional segments of the trace 16 can also be provided distally and proximally of the view shown in FIG. 2. While the segments 11-14 are identified for trace 16, other traces of the trace array 4 can have segments of the same configuration (e.g., same length and layout).

The disk drive control circuitry 20 can be configured to output signals to the traces of the trace array 4 to be conducted to the transducers 7 or other electrical elements. Likewise, the disk drive control circuitry 20 can be configured to receive signals from the transducers 7 or other electrical elements via the traces. These signals can be distorted by various factors. One such factor is phase distortion in which the phase of the signal changes at different rates according to subtle changes in the individual traces of the array 4. This phase distortion can be seen as a non-constant (e.g., non-linear) change in phase with respect to frequency. Group delay, as used herein, is defined as the change in phase for a change in frequency. A system with non-constant group delay has phase distortion, whereas a system with constant group delay does not have such phase distortion. Unacceptable distortion occurs when the change in the phase of a signal transmitted along a trace does not vary linearly with frequency. A trace in which the derivative of the change in the phase of a transmitted signal with respect to frequency is non-constant will be characterized by an unstable frequency response and will unacceptably distort the signal. Group delay is also affected by source and load impedances which can result in different phase responses at different source impedances. Various embodiments of the present disclosure concern techniques for improving group delay performance by making the group delay constant (e.g., linear) across operational frequencies used in hard disk drive reading and writing (e.g., 0.0-2.0 gigahertz), as further discussed herein.

Figure 3:
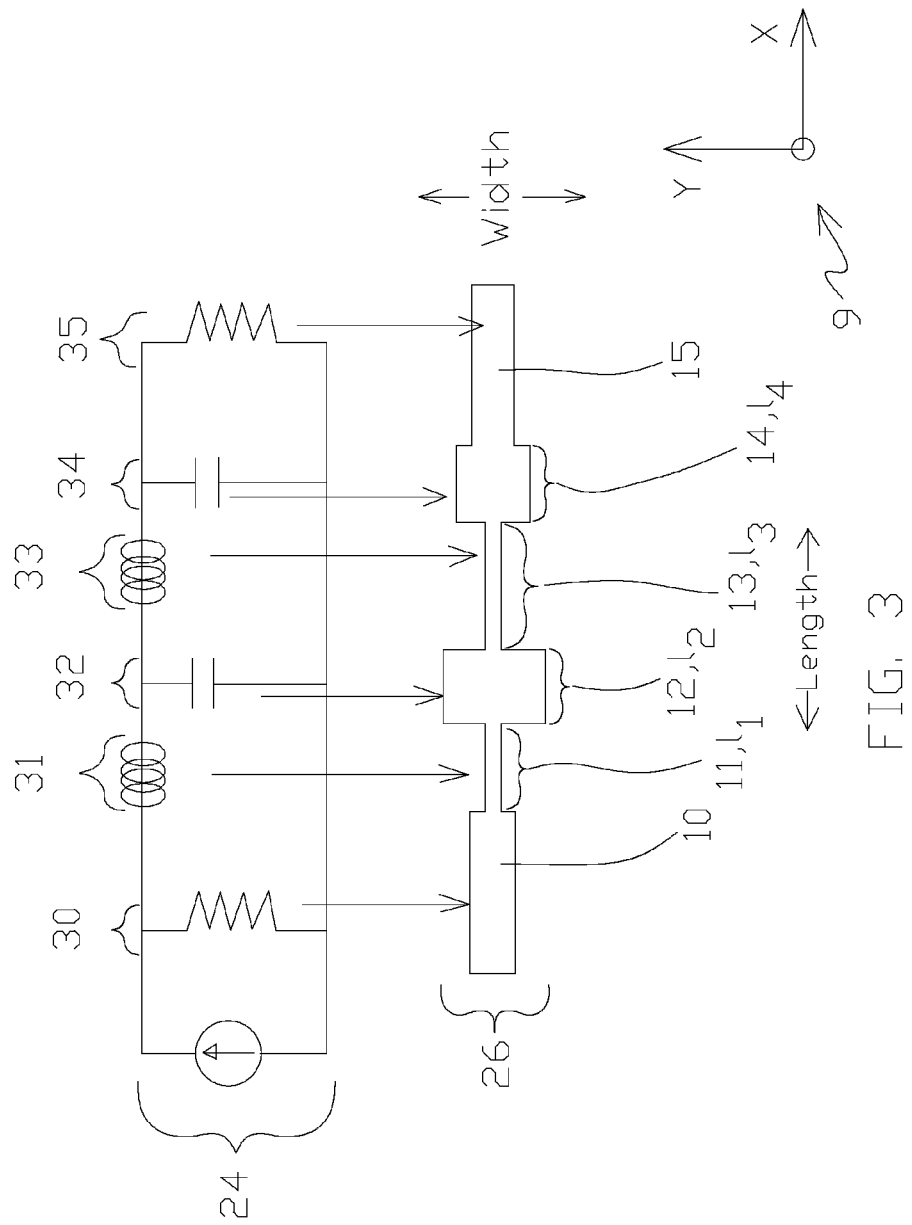
FIG. 3 illustrates a stepped impedance filter circuit and a variable width trace that approximates the stepped impedance filter circuit.

Filtering can be employed to achieve a more stable phase response across operational frequencies, such as by flattening the response at various frequencies. A filter having alternating high and low impedance sections can help produce the desired response. FIG. 3 shows a schematic view of a stepped impedance filter 24 of inductors and capacitors having alternating high and low impedance sections. The inductance and capacitance values of the alternating inductors and capacitors can be selected to produce the desired filtering results to achieve a constant group delay. A filter synthesis design program can be used in such filter design. Such programs allow the setting of load and source impedances and the number of filter elements, and output the corresponding stepped impedance inductor and capacitor values. Such a process can be used to determine the impedance, inductance, and capacitance values of the inductor elements 31, 33 and the capacitor elements 32, 34 of the stepped impedance filter 24.

The design of the stepped impedance filter 24 can further include tuning the values of the inductor elements 31, 33 and the capacitor elements 32, 34 to flatten the group delay. Such tuning can include minimizing the range of group delays for the various source and load impedances as group delay can be a function of source and load impedances. The design of the stepped impedance filter 24 can include selecting elements having impedance values as far apart from each other as possible.

Instead of using the conventional inductor elements 31, 33 and the capacitor elements 32, 34 in a filtering circuit, the trace segments 11-14 themselves can serve as approximations of the alternating inductors and capacitors. Specifically, the width of the trace 16 can change at the junctions between adjacent trace segments 11-14 such that the trace segments 11-14 respectively and as a whole correspond in function to the circuit elements 31-34, as shown in the trace filter 26 of FIG. 3. The widths of the end segments 10, 15 (respectively proximal and distal of the trace segments 11-14) can be equal to each other while the widths of the trace segments 11, 13 can be smaller than the width of the end segments 10, 15 and the widths of the trace segments 12, 14 can be larger than the width of the end segments 10, 15. In this way, the trace filter 26 comprises a plurality of trace segments 11-14 having a plurality of different widths to function similarly to the stepped impedance filter 24. The end segments 10, having a baseline width can function in correspondence to the end resistance circuit elements 30, 35. The narrow segments 11, 13 have a relatively small width relative to the baseline width and can function in correspondence to inductor elements 31, 33. In this way, the narrow segments 11, 13 have relatively high impedance. The wide segments 12, 14 have a relatively large width relative to the baseline width and can function in correspondence to capacitor elements 32, 34. In this way, the wide segments 12, 14 have relatively low impedance.

The lengths of the trace segments 11-14 can be optimized to control the signal group delay of the flexure 1. Each of the segments 11-14 has a respective length $l_1$-$l_4$ generally along the X-axis. As shown, the lengths $l_1$-$l_4$ are different from each other. The length of a particular trace segment can be set by a process that includes determining the phase constant by simulating the propagation of a signal along the trace segment structure and measuring the phase velocity. From this velocity the phase constant can be determined for the segment. The phase constant can then be used to calculate a length for the segment that improves group delay performance as further discussed herein.

The process for setting the lengths $l_1$-$l_4$ of the high and low impedance segments 11-14 of the trace 16 includes creating a physical or simulated coupon model of each segment of the trace filter 26. The coupon model can be simulated in an electromagnetic computer modeling program, such as Agilent's ADS™ or CST Microwave Studio™. Segment 11 will be used as an example below for demonstrating a process for setting the length of the segment 11 to improve linear group delay performance, but it is noted that the same or similar process can be repeated for setting respective lengths of the other segments 12-14 to improve linear group delay performance for the entire trace filter 26.

Figure 4:
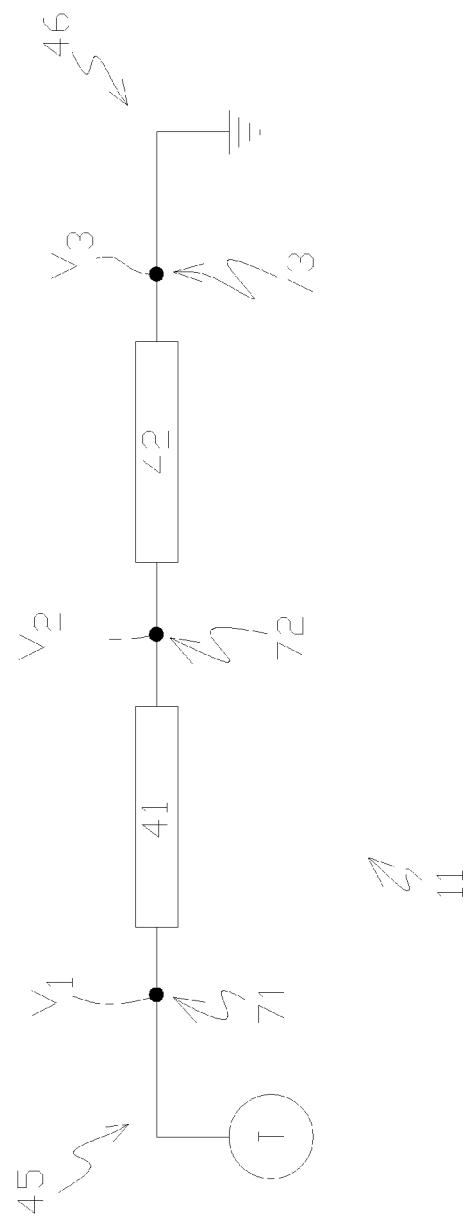
FIG. 4 is a schematic illustration of a segment of the variable width trace of FIG. 3.

In order to determine the phase constant for segment 11, a computer modeling program can be used to simulate the segment structure. FIG. 4 shows a schematic view of segment 11 arranged into subsegments 41, 42 between a first end 45 and a second end 46, which can resemble the electrical modeling of the segment 11. The subsegments 41, 42 can each be the same length, such as 2 millimeters. Nodes 71-73 can be respectively located between the subsegments 41, 42. A signal parameter can be measured between each of the subsegments 41, 42 at the nodes 71-73 to track the signal propagation. For example, the maximum signal amplitude can be measured at the nodes 71-73. Also, the difference in time for the signal amplitude to exceed a threshold at adjacent pairs of the nodes 71-73 can also be measured. The delay in the signal along the segment 11 can be determined by comparing the timing of the maximum signal amplitude between the nodes 71-73. The measurement signals from the nodes 71-73 can be plotted or otherwise analyzed, such as with transient analysis, as further discussed herein. Preferably, the signal is generated at the maximum operational frequency expected to be used along the trace 16. While two subsegments 41, 42 and three nodes 71-73 are shown for the segment 11, it will be understood that any number of subsegments and nodes can be provided, such as two nodes and a single subsegment.

Being that the nodes 71-73 from which the voltage signals are measured are arrayed along the length of structure made up of the segment 11, the signal traveling from the first end 45 to the second end 46 will undergo change, and in particular will be delayed. From this delay, a delay constant (e.g., phase constant) for the segment 11 can be determined, as further discussed herein.

Figure 5:
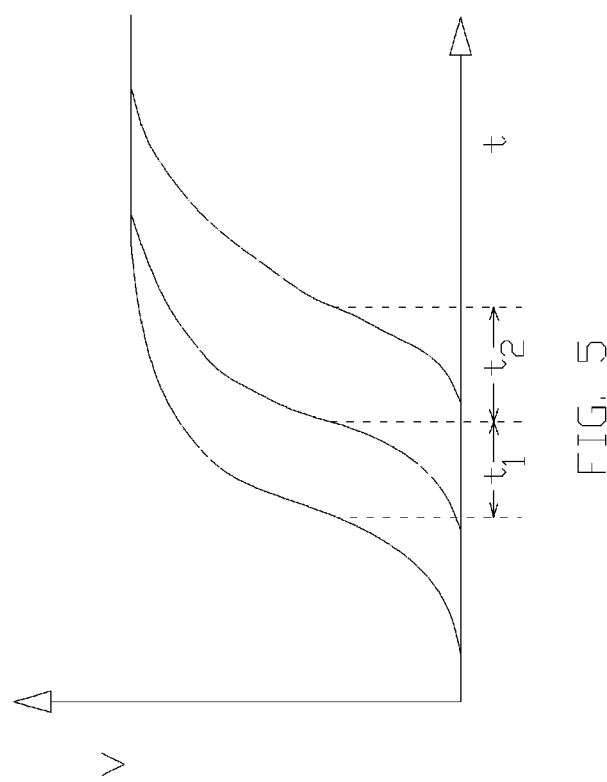
FIG. 5 is a plot of signal delay along the segment of FIG. 4.

FIG. 5 shows a contrived plot of a signal sampled at the nodes 71-73 as the signal traveled along the segment 11. The plot of FIG. 5 shows a first signal delay $t_1$ representing the time in which the signal passed between nodes 71, 72 and a second signal delay $t_2$ representing the time in which the signal passed between nodes 72, 73. Based on one or more of the signal delays (e.g., the sum or average of $t_1$, $t_2$), a phase constant along of the segment 11 can be calculated. With reference to FIG. 5, for example, $t_1$ can be divided by its corresponding distance (i.e., the length of subsegment 41 in FIG. 4) to give a velocity. Then the individual phase constant for subsegment 41 is equal to $2\pi$(maximum operational frequency/this velocity). The overall phase constant used in the length calculation can then be the average of the individual phase constants for subsegments 41 and 42 in FIG. 4. Typically, the segment shown in FIG. 4 can have at least five subsegments to help in this averaging. The phase constant can correspond to the change in the phase of the signal per unit length.

This determined phase constant can then be used to calculate a length ($l_1$) of the segment 11 that improves linear group delay performance. The below equation can be used to calculate the length ($l_h=l_1$) of this high impedance segment 11.

$$l_h = \frac{2\pi f_c L}{Z\beta} \qquad \text{Equation 1}$$

The above equation is described in Pozar, "Microwave Engineering", 4th Edition pp. 424 eq. 8.86a. In the above equation, $f_c$ is the cutoff frequency, Z is the impedance, L is the inductance, and $\beta$ is the phase constant of the segment 11. $f_c$ can be based on the highest frequency out to which the low pass filter needs to support with a constant phase delay. L can be the inductance of the modeled element. Z can be the impedance of the modeled element. The output $l_h$ value can then be used to define the end-to-end trace length of the narrow high impedance segment 11 (i.e. the length from the distal edge of segment 10 to the proximal edge of segment 12). The above equation can also be used to calculate trace segment lengths of the other high impedance sections (e.g., $l_3$ of segment 13) after a phase constant is calculated for each respective segment. As a constraint, each trace segment 11-14 length $l_{1-4}$ may be kept to be less than n/4. In connection with this calculation, the product of the phase constant and segment length can be $<\pi/4$, where the phase constant is in rad/meter and length is in meters, so the product is in radians (i.e. unitless). Constraining each trace segment length to be less than $\pi/4$ ensures that the segment is short relative to the speed of the signal.

The following equation can be used to calculate the length ($l_1$) of low impedance sections (e.g., lengths $l_2$, $l_4$ of segments 12, 14):

$$l_1 = \frac{2\pi f_c CZ}{\beta} \qquad \text{Equation 2}$$

The above equation is described in Pozar, "Microwave Engineering", 4th Edition pp. 424 eq. 8.86b. In the above equation, $f_c$ is the cutoff frequency, Z is the impedance, C is the capacitance, and $\beta$ is the phase constant of the particular segment for which the $l_1$ is being calculated. $f_c$ can be based on the highest frequency out to which the low pass filter needs to support with a constant phase delay. C is the capacitance of the modeled element. Z is the impedance of the modeled element. The output $l_1$ value can then be used to define the end-to-end trace length of the wide low impedance segment (e.g., lengths $l_2$, $l_4$ of segments 12, 14).

The above process can be separately performed for each of the segments 11-14 to determine a phase constant and then a trace length for each respective segment. It is noted that the trace array 4 can have multiple traces of similar layout such that the traces have corresponding segments. In some cases, a length set for one segment of one trace can then be used as the length for a similar segment (e.g., having a similar layout) of another trace of the trace array 4. In some other embodiments, the phase constant of each segment of each trace along a trace filter of an array is measured separately and the length of each segment of each trace along the trace filter of the array is likewise calculated separately.

After the setting of each trace segment length of the trace filter 26, the length of the first high impedance segment 11 can further be adjusted to optimize impedance of the circuit with respect to overall group delay and minimize the spread of the group delay for various source and load impedances.

For optimization of the filter in a system environment, the rest of the flexure 1 can be terminated in the highest bandwidth Tline matched to the impedance of a preamplifier that is either on the proximal end 6 of the flexure 1 or part of the disk drive control circuitry 20 which is electrically connected to the trace that comprises the trace filter 26.

After the segment 11-14 lengths $l_{1-4}$ are set, the flexure 1 can be formed using the set lengths. For example, the length of each segment may be equal to the calculated length according to the equations provided above. The segments 11-14 can function as a trace filter 26 in similarity to the stepped impedance filter 24. Specifically, the segments 11 and 13 can function as high impedance elements in similarity to inductor elements 31, 33. The segments 12 and 14 can function as low impedance elements in similarity to capacitor elements 32, 34. The alternating arrangement of the low and high impedance segments 11-14 function as a filter of read/write data signals transmitted along the flexure 1 to provide for linear group delay performance across an operational frequency band.

Figure 6:
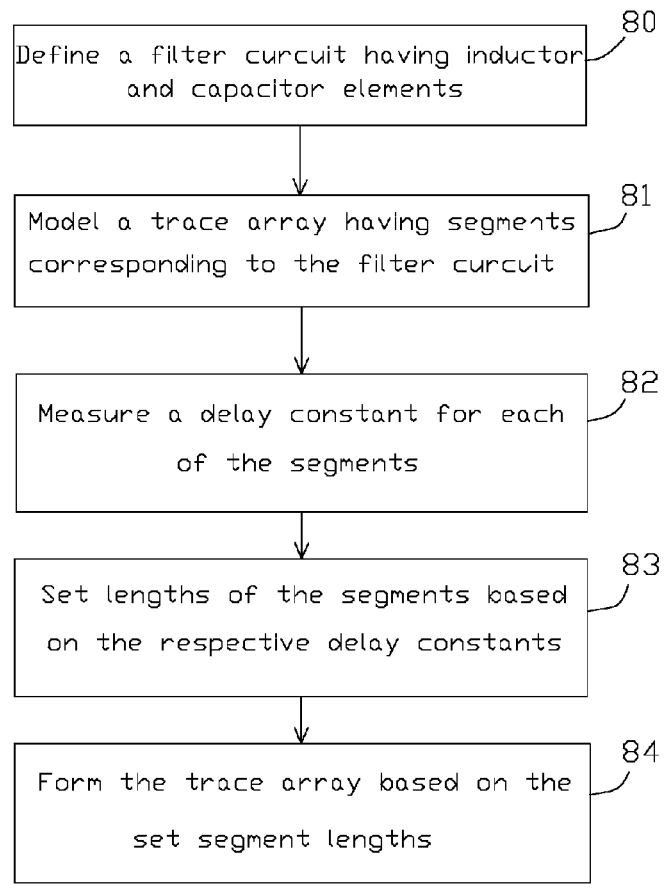
FIG. 6 is a flowchart of a method for forming a trace array.

FIG. 6 is a flowchart of a method for forming a flexure having a trace array with a consistent group delay across an operational frequency band. The method includes defining 80 a filter circuit. The defined 80 filter circuit can correspond to the stepped impedance filter 24 of FIG. 3, for example. The defined 80 filter circuit can have alternating high and low impedance elements, such as inductors and capacitors. The filter circuit can be defined 80 in a filter modeling software program. Defining 80 the filter circuit may include tuning single ended inductors and capacitors to flatten overall group delay and maximize rmr group delay spread in the expected bandwidth of the data transmission signal used with the flexure.

The method further includes modeling 81 a trace array having segments that correspond to the defined 80 filter circuit. The trace array can be modeled in a modeling software program, such as an electromagnetic computer simulation software program. Alternatively, the trace array can be modeled 81 as a physically embodied trace array with which tests can be performed, such as measuring a phase delay for each trace segment. The modeled trace array comprises a plurality of traces, and each trace has a plurality of segments corresponding to inductor and capacitor elements. The widths of the segments can be varied such that the segments function as high and low impedance elements. More specifically, the widths of the segments can be varied such that the segments function in approximation of the inductor and capacitor elements of the defined 80 filter circuit.

The method further includes measuring 82 a phase constant for each of the segments of the modeled trace array. The measuring 82 can be performed in an electromagnetic computer simulation software program. Alternatively, the measuring 82 can be performed on the physically embodied trace array. The measuring 82 can include transient analysis at the maximum expected frequency of the data transmission signal used with the flexure. For example, a respective signal can be sent or simulated along each segment. Monitoring can be performed at a plurality of nodes along each segment at consistent distances. The measuring 82 can assess delay in the signal, such as phase between each of the nodes. The measuring 82 can then include determining a delay constant, such as phase constant unique to the segment, based on the delay.

The method further includes setting 83 lengths of the segments based on the delay constants respectively measured 82 for the segments. The lengths may be set 83 ensuring that each segment length is less than $\pi/4$. The lengths may be set 83 based on a formula or according to tables reflecting a relationship between a delay constant and segment length of a high or low impedance element, e.g., as disclosed herein.

The method further includes forming 84 the trace array based on the set 83 segments lengths. The trace array may be formed 84 by etching from a substrate or metal deposition, among other known fabrication processes. The lengths of the segments may equal those of the set 83 lengths.

The method of FIG. 6 can correspond to the process demonstrated in FIGS. 1-5. While the method of FIG. 6 can be used to determine respective segments for a plurality of traces of an array, the method may alternatively be employed to determine the length of only one segment of one trace, only one segment of multiple traces, or multiple segments for one trace.

Once formed, a trace array can have one or more traces forming a trace filter. Each trace comprises a plurality of trace segments having different trace widths with respect to each other along the trace filter. The impedance of adjacent trace segments along the trace filter can alternate between high and low impedance. Each trace segment can correspond in function to either a capacitor or an inductor element. Each segment has a respective phase constant. The length of each segment along the trace filter is different from the length of the other trace segments along the trace filter. The length of each trace segment along the trace filter is proportional to the phase constant of the segment. More specifically, the length of each high impedance segment can be based on (e.g., equal to) $l_h$ of Equation 1 provided herein. The length of each low impedance segment can be based on (e.g., equal to) $l_l$ of Equation 2 provided herein.

Although exemplar embodiments are presented herein to demonstrate various features of the present invention, various modifications are contemplated as being within the scope of the present disclosure. Those skilled in the art will recognize that changes can be made in form and detail to the disclosed and referenced embodiments without departing from the spirit and scope of the invention. For example, a trace or trace array as disclosed herein can be employed in circuits other than hard disk drives. Likewise, the process disclosed herein for determining the length of a trace segment of a trace filter can be used in a variety of different types of circuit, including but not limited to hard disk drives.

The following is claimed:

1. A method of forming a trace of a flexure of a hard disk drive, the method comprising:
   modeling the trace as having a plurality of trace segments corresponding to elements of a filter circuit comprising inductors and capacitors;
   measuring a change in a signal between a plurality of nodes that are longitudinally arrayed along one of the trace segments;
   setting a length of the trace segment based on the change in a signal; and
   forming the trace based on the set length.

2. The method of claim 1, wherein measuring the change in the signal comprises determining a delay in the signal between the plurality of nodes.

3. The method of claim 1, wherein the change in the signal is a phase delay.

4. The method of claim 1, further comprising determining a phase constant based on the step of measuring the change in the signal, wherein setting the length of the trace segment further comprises setting the length of the trace segment based on the phase constant.

5. The method of claim 1, wherein:
measuring the change in the signal further comprises, for each segment of the plurality of segments, measuring the change in a signal between a plurality of nodes along the segment, and
setting the length further comprises, for each segment of the plurality of segments, setting a length for the segment based on the change in the signal between the plurality of nodes along the segment.

6. The method of claim 1, wherein the length of the trace segment is set such that the trace segment has a linear group delay response across an operational frequency range of the flexure.

7. The method of claim 1, wherein the filter circuit is a low pass filter and the plurality of trace segments function as a low pass filter.

8. The method of claim 1, wherein the plurality of segments are serially arrayed end-to-end with respect to each other.

9. The method of claim 1, wherein setting the length of the segment further comprising limiting the length to being less than π/4.

10. The method of claim 1, wherein modeling the trace array comprises modeling the segments as a coupon model in software.

11. The method of claim 1, wherein the filter circuit comprises a plurality of low impedance elements and a plurality of high impedance elements, and each segment of the plurality of segments respectively functions in correspondence to either one of the plurality of low impedance elements or one of the plurality of high impedance elements.

12. The method of claim 1, wherein the nodes are spaced 2 millimeters apart.

13. The method of claim 1, wherein the trace is electrically connected to a transducer on a distal end of the flexure and a preamplifier on a proximal end of the flexure.

14. The method of claim 1, wherein the trace array comprises at least two traces in a stacked arrangement.

15. The method of claim 1, wherein each of the steps of modeling the trace, measuring the change, and setting the length is performed by one or more processors executing program instructions stored in memory.

16. A method of forming a trace array of a flexure of a hard disk drive, the method comprising:
modeling a trace array having a plurality of traces, each trace having a plurality of trace segments corresponding to elements of a filter circuit comprising inductors and capacitors;
for each trace segment of the plurality of trace segments, measuring a phase delay in a signal from a plurality of nodes that are longitudinally arrayed along the trace segment;
for each trace segment of the plurality of trace segments, determining a phase constant of the segment based on the phase delay;
for each trace segment of the plurality of trace segments, setting a length of the trace segment based on the phase constant of the trace segment; and
forming the trace array based on the set lengths.

17. The method of claim 16, wherein measuring the phase delay for each of the plurality of trace segments comprises measuring the change in phase in a signal between a plurality of nodes along the segment.

18. The method of claim 16, wherein setting the length of the trace segment based on the delay constant of the trace segment comprises setting the length as proportional to the phase constant of the trace segment.

19. A method of forming a trace array of a flexure of a hard disk drive, the method comprising:
modeling a trace array having a plurality of traces, each trace having a plurality of trace segments corresponding to elements of a filter circuit having alternating high and low impedance elements;
for each trace segment of the plurality of trace segments, measuring a phase delay in a signal from a plurality of nodes that are longitudinally arrayed along the trace segment;
for each trace segment of the plurality of trace segments, determining a phase constant of the segment based on the phase delay;
for each trace segment of the plurality of trace segments, setting a length of the trace segment based on the phase constant of the trace segment, wherein the length of each trace segment is set such that the trace has a linear group delay response across an operational frequency range of the flexure; and
forming the trace array based on the set lengths.

20. The method of claim 19, wherein setting the length of the trace segment based on the phase constant of the trace segment comprises setting the length as proportional to the phase constant of the trace segment.

* * * * *